United States Patent
Rao et al.

(10) Patent No.: US 8,135,424 B2
(45) Date of Patent: Mar. 13, 2012

(54) METHOD TO IMPROVE DIVERSITY GAIN IN A COOPERATIVE SPECTRUM SENSING NETWORK

(75) Inventors: Yadunandana N. Rao, Sunrise, FL (US); Apoorv Chaudhri, Cambridge, MA (US); Sudhir Rao, Secunderabad (IN)

(73) Assignee: Motorola Solutions, Inc., Schaumburg, IL (US)

( * ) Notice: Subject to any disclaimer, the term of this patent is extended or adjusted under 35 U.S.C. 154(b) by 578 days.

(21) Appl. No.: 12/327,543

(22) Filed: Dec. 3, 2008

(65) Prior Publication Data

US 2010/0137014 A1    Jun. 3, 2010

(51) Int. Cl.
 *H04B 7/00* (2006.01)
 *H04B 15/00* (2006.01)
(52) U.S. Cl. ........ 455/509; 455/512; 455/515; 455/434; 455/67.11; 370/237
(58) Field of Classification Search .................. 455/509, 455/512, 551, 552, 445, 422.1, 423, 434; 370/237, 241, 462, 465
 See application file for complete search history.

(56) References Cited

U.S. PATENT DOCUMENTS

| 8,004,995 B2 * | 8/2011 | Hyon et al. ............ 370/241 |
| 2009/0207735 A1 * | 8/2009 | Letaief et al. ............ 370/237 |
| 2010/0062718 A1 * | 3/2010 | Zhou et al. ............ 455/67.11 |
| 2011/0003608 A1 * | 1/2011 | Forenza et al. ............ 455/501 |

OTHER PUBLICATIONS

H. Wang et al—"Entropy-Based Sensor Selection Heuristic for Target Localization"—2004—pp. 36-45.

* cited by examiner

*Primary Examiner* — Temesgh Ghebretinsae
*Assistant Examiner* — MD Talukder
(74) *Attorney, Agent, or Firm* — Barbara R. Doutre

(57) ABSTRACT

A cooperative sensing technique (300) operates by selecting a group of subscribers (302) from a secondary system, measuring a cooperative sensing metric (306) and then using the metric to identify an achievable spatial diversity gain for the group of selected subscribers (308). Once an achievable spatial diversity gain is determined for the group (308/412), it is compared to a required spatial diversity gain (310), and if the condition is met at (310), the validated group can begin spectrum sensing (314) to identify a vacant/suitable channel for operation. If the achievable spatial diversity gain is insufficient, then a new group of users is selected (312) within the secondary system and the process repeats itself.

9 Claims, 5 Drawing Sheets

METHOD TO IMPROVE DIVERSITY GAIN IN A COOPERATIVE SPECTRUM SENSING NETWORK

FIELD OF THE INVENTION

The invention generally relates to communication systems and more particularly to cooperative spectrum sensing in cognitive radio networks.

BACKGROUND OF THE INVENTION

Wireless products and services have continued to expand to the point that finite resources of available communication spectrum are being overwhelmed. Industry has been forced to make dramatic changes, as it must adapt to accommodate the exponential demand on spectrum access, efficiency and reliability.

The Federal Communications Commission (FCC) in the United States, and its counterparts around the world, allocate radio spectrum across frequency channels of varying bandwidth. Various bands may cover, for example, AM radio, VH television, cellular phones, citizen's-band radio, pagers and so on. As more devices go wireless, an increasingly crowded amount of radio spectrum needs to be shared. Although the radio spectrum is almost entirely occupied, not all devices use portions of the radio spectrum at the same time or location. At certain times, a large percentage of the allocated spectrum may be sitting idle, even though it is officially accounted for. Regulatory authorities are beginning to permit usage of allocated spectrum on a secondary basis under certain strict constraints. For example, the FCC is beginning to permit the secondary usage of channels 21-51, also known as TV white space.

Cognitive radio is a term used to describe a suite of technologies with the potential to significantly alter the manner in which spectrum is utilized by future radio systems. A paradigm for wireless communication in which either a network or wireless device alters its transmission or reception parameters to avoid inference with licensed or unlicensed incumbent users, cognitive radio implements measures to avoid selecting an occupied frequency, so as to avoid interference that can possibly damage the incumbent device and/or reduce its signal reception quality. The alteration of parameters is based on active monitoring of several factors in the external and internal radio environment, such as radio frequency usage, user behavior and network state. Cognitive radio operation in TV White Space is strictly conditional on reliable detection of occupied and unoccupied spectrum and is also conditional on fast network recovery in the case of in-band incumbent detection.

Cooperative spectrum sensing is a technique used to increase the probability of detection of primary users leading to reduced interference to the primary users by the cognitive radio network. However, cooperative sensing has certain drawbacks when individual nodes experience correlated fading or shadowing effects. Shadowing or long term fading refers to variation in received power due to large obstacles between the transmitter and the receiver. The cooperative sensing network quickly becomes inefficient as the cooperative sensing gains diminish with correlated fading/shadowing.

Accordingly, improvements are sought in cooperative sensing techniques to improve network efficiency and reduce interference to primary users.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
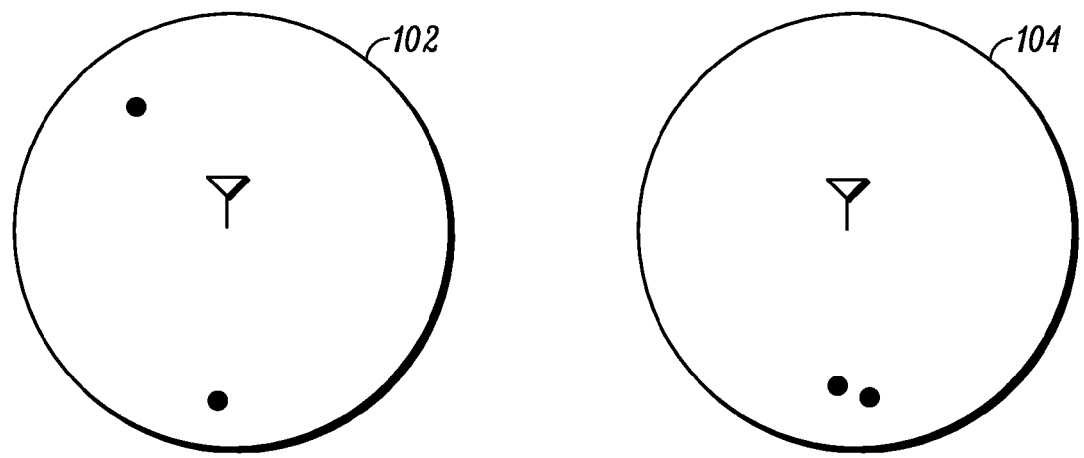
FIG. 1 is an example of two cognitive radio networks having different spatial separation between their respective subscriber units.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to spectrum sensing management and control techniques. Cognitive radios are typically secondary unlicensed users which temporarily utilize available unused spectrum to maximize overall spectrum usage. The key challenge in optimizing spectrum usage is to avoid interference with primary users at all costs.

Throughout the description the terms nodes and subscribers have been used interchangeably and are intended to represent the same entity. The cooperative sensing technique provided herein achieves a high probability of detection with robustness to deep fades by choosing a group of cooperating nodes that provides needed spatial diversity gain, while keeping the number of cooperating nodes to a minimum. Further, the invention does not require any location information of the cooperating nodes. Briefly stated, the cooperative sensing technique operates by selecting a group of subscribers belonging to a secondary system, estimating a cooperative sensing metric and then validating the metric to identify an achievable spatial diversity gain for the group of selected subscribers. The achievable spatial diversity gain is then compared to a required or target spatial diversity gain required to meet the desired probability of primary user detection given a specified false alarm rate. If the chosen group of cooperating nodes provide the necessary spatial diversity gain, then each node senses a channel for the presence of the primary user and a decision is made based on the sensing results of each node. If the group of devices declares that the channel has no primary activity, then communication can take place amongst the secondary users utilizing an unused channel usually dedicated to a primary system. On the other hand, if the achievable spatial diversity gain is insufficient, then a new group of users is selected within the secondary system and the process repeats itself.

Accordingly, the apparatus components and method steps to be described herein have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

FIG. 1 is an example of two cognitive radio networks having different spatial separation between their respective subscriber units. FIG. 1 shows how correlated shadowing significantly impacts the Cooperative Sensing (CS) performance. Shadowing or long term fading refers to variation in received power due to large obstacles between the transmitter and the receiver. The power variation has a normal distribution in dB scale with a variance $\sigma_{dB}$ in the range of 6-10 dB. Two users who are spatially very close to each other, as in 104 undergo highly correlated shadowing, while highly separated users in 102 undergo uncorrelated shadowing. The correlation in shadowing is a function of the spatial separation between two users and the topography in which they operate. The effects of correlated shadowing can be modeled by an exponential function R(d), where d is the separation between the users and the constant $d_0$ takes different values according to the terrain (urban or suburban) as shown in equation (1).

$$R(d) = e^{\frac{-d}{d_o}} \quad (1)$$

Figure 2:
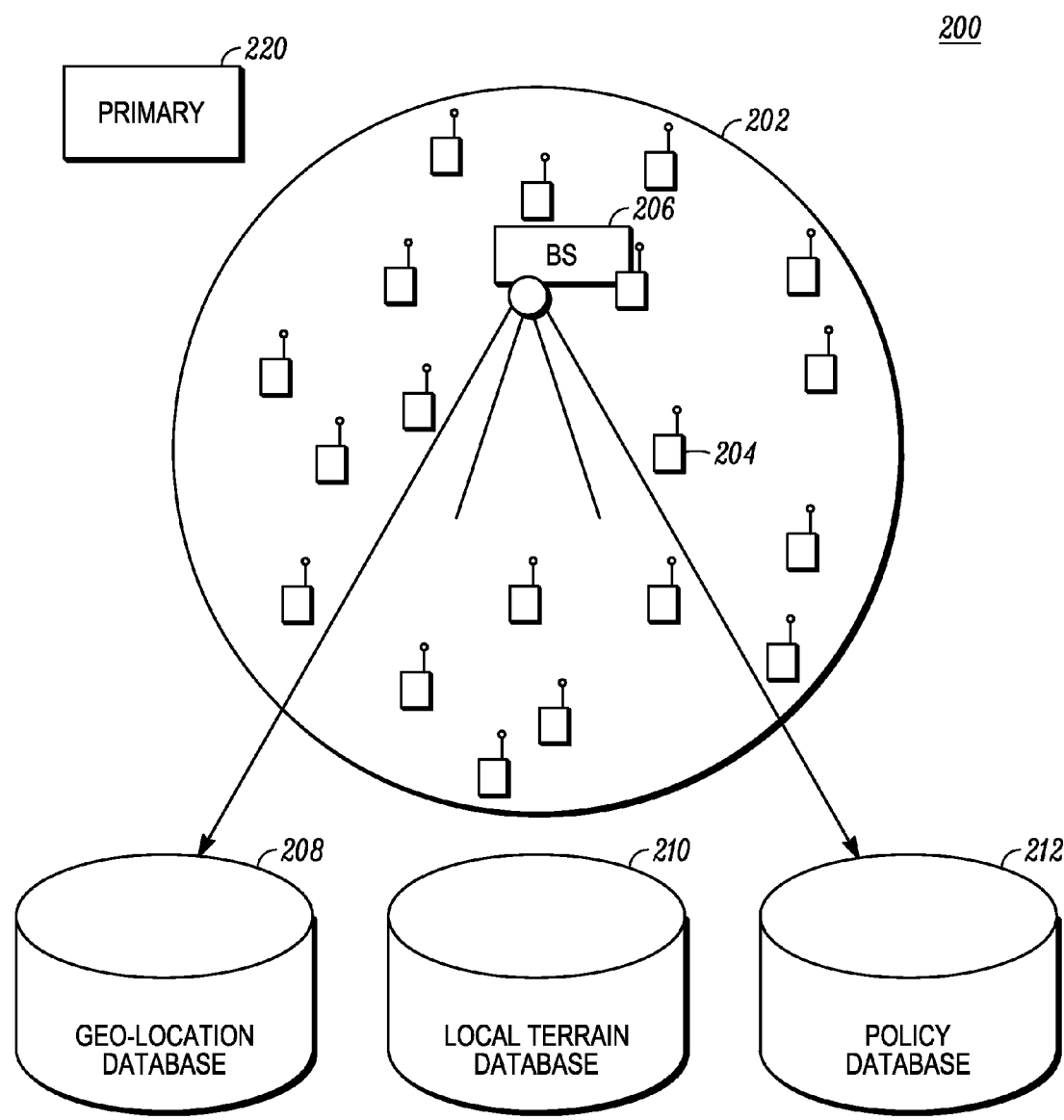
FIG. 2 is a block diagram of a cognitive radio network operating in accordance with an embodiment of the invention.

Referring to FIG. 2, there is shown a cognitive radio (CR) network 202 operating in accordance with the cooperative sensing technique of the present invention. CR network 202 comprises a plurality of cognitive radio subscribers (CRs) 204 and a base station or access point (AP) 206 having access to CR databases, such as geo-location database 208, local terrain database 210 and policy database 212. The CR subscribers may be two-way radios, cellular phones, and/or combinations of mixed two-way radios and cell phones or the like. The plurality of CR databases 208, 210, 212 may be located outside of the network 202 or internally within base station 206. The illustration of the databases is simply to show that the base station 206 has access to geo-location, terrain and spectrum policy information. Network 202 utilizes cooperative sensing so as not to interfere with primary/incumbent system 220 operating under policies governed by a regulatory authority or other higher prioritized secondary system.

The cognitive radio network 202 operating under the cooperative sensing technique of the present invention caters to a situation where the power of the primary/incumbent system 220 is unknown and can either be a high power or a low power device. The type of primary system 220 can be made up of either high power devices, such as a television station or low power devices, such as wireless microphone or even other cognitive radios from a different network. Location information of the primary system 220 is accessible via geo-location database 208. Policy information, associated with the primary system 220 as well as the cognitive radio system 202, is known and accessible via database 212.

Cognitive radio network 202 operating in accordance with the present invention minimizes interference with primary source 220 while, at the same time, maximizing opportunistic spectral usage. Spectral sensing is an important aspect of the technique being applied to cognitive network 202. The spectral sensing incorporates cooperation between users to improve primary user detection capability.

Figure 3:
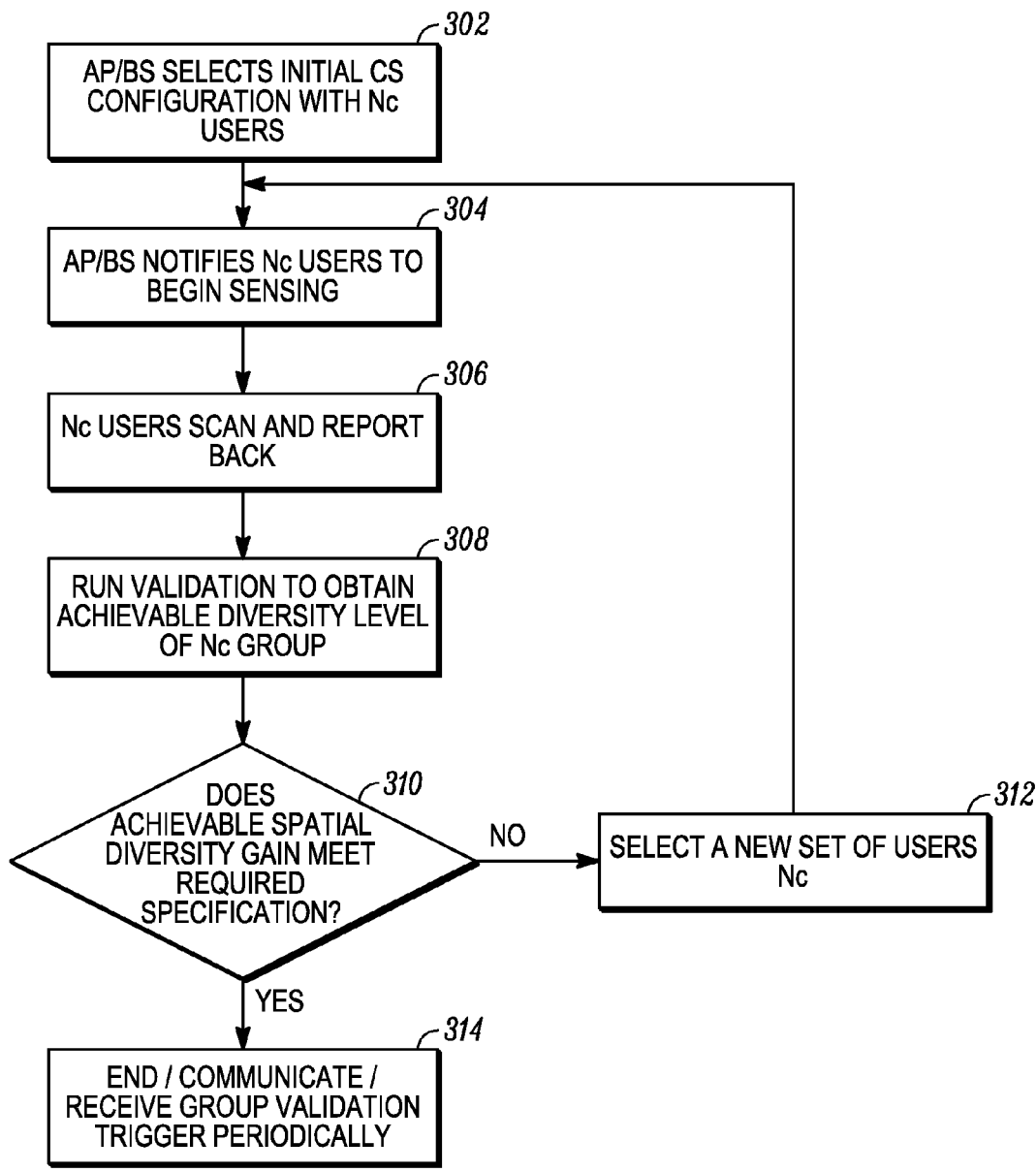
FIG. 3 illustrates an example of the cooperative sensing technique in accordance with an embodiment of the invention.

FIG. 3 illustrates an example of the cooperative sensing technique 300 in accordance with an embodiment of the invention. Referring to the CR network 202 of FIG. 2 in conjunction with the sensing technique of FIG. 3, base station (BS) 202 begins at step 302 by selecting an initial cooperative sensing (CS) group with Nc users from CRs 204. The Nc users selected by the BS are notified to begin sensing and report X measurements of hard/soft information at step 304. The sensing configuration may include the channels or frequencies to sense, type of sensing method and type of sensing feedback as well as known and unknown transmitters. The goal of obtaining sensing results from the CR nodes is to estimate the achievable spatial diversity of a given group of nodes. The fact that spatial diversity is independent of the transmitter locations, it is possible to utilize known sources (transmitters) for sensing, such as known TV stations, cell towers etc. The X measurements are taken over a period of time. The same type of measurements will be requested by the BS, so there are X measurements of same type from each user. All the Nc users scan the channel and report back sensed data in the form of hard decisions/soft information to the BS at 306. A hard decision is 1/0 binary decision specifying whether activity is detected or not detected on a channel. Soft information for a channel can be signal-to-noise ratio (SNR) values, received signal strength indicator (RSSI), correlation data to name a few.

Figure 4:
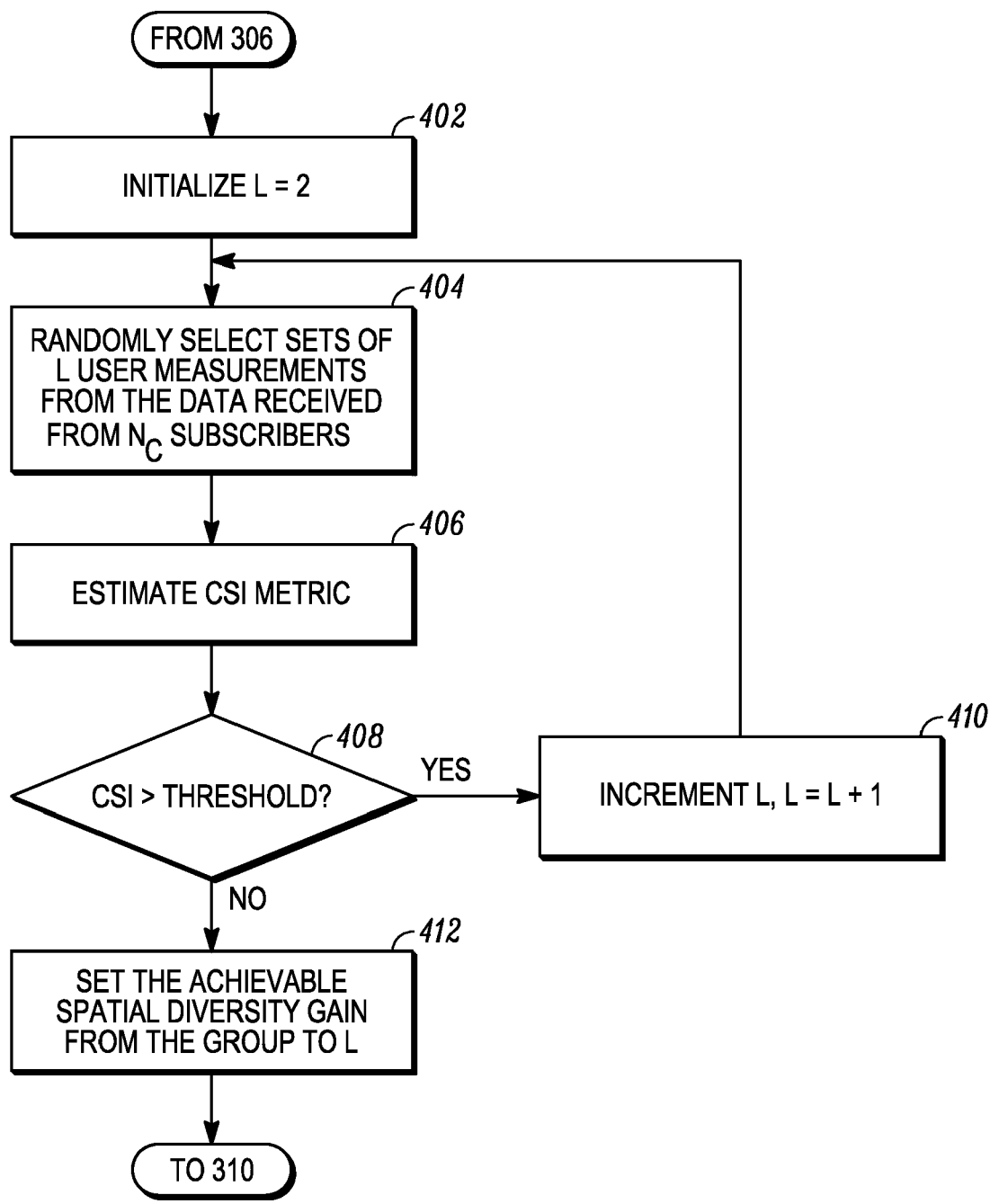
FIG. 4 is illustrates an embodiment of the validating and combining portion of the cooperative sensing technique of FIG. 3.

Upon receipt of the sensing results (hard/soft information) from Nc users, the base station 206 runs a validation algorithm to validate the spatial diversity of the user group based on sensing data at step 308, as will be elaborated in FIG. 4. Briefly, validation 308 compares cooperative sensing index (CSI) metrics to threshold(s) to identify the achievable spatial diversity gain of the Nc group of CRs, wherein the CSI metric is calculated using sensing data collected from the CRs in the Nc group. Thus validation step 308 results in an achievable spatial diversity gain of the Nc group of subscribers.

Once the validation step 308 is complete, the technique moves to step 310 where the base station 206 checks if the achievable spatial diversity gain of the group of Nc subscribers meets a required spatial diversity gain or not. The required spatial diversity gain for system 200 is a function of the desired probability of detection (at a known false alarm rate) and may be specified within the databases, 208, 210 or 212 or specified by an external source, such as a system engineer and as such will be considered a predetermined spatial diversity gain. If the predetermined spatial diversity gain is not met at 310, then another group of users is selected at 312, and the technique returns to step 304 to notify and begin cooperative sensing again using the new group of users. If the predetermined spatial diversity gain is met at 310, the validated group can start spectrum sensing at 314 to identify a vacant/suitable channel for operation. Periodic triggers can be used to ensure that the group remains validated or gets updated. Maintaining diversity of the CRs participating in cooperative sensing in order to reliably detect primary incumbents as provided by method 300 allows a secondary system 200 to communicate over a channel typically dedicated to the primary system without interfering with the primary system.

Referring to FIG. 4, the validation method 308 is described in more detail in accordance with an embodiment. The term "node" will be used instead of subscriber simply to facilitate explanation. Validation 308 is performed by the base station 206. Since the minimum number of nodes needed for cooperation is at least 2, an initial value of L=2 is chosen. Thus, two nodes are randomly selected from Nc users at 402.

The base station then selects sets of sensing measurements from the randomly chosen L nodes out of $N_c$ nodes at step 404. Note, as shown in equation (2), that there will be:

$$\binom{N_c}{L} = \frac{N_c!}{(N_c - L)!L!} \quad (2)$$

sets of L nodes out of a set of $N_c$ nodes.

The base station 206 estimates the Cooperative Sensing Index (CSI) metric using the measurements taken by the randomly selected L nodes. CSI is based on the statistical Entropy metric which is a measure of the uncertainty or randomness. For the sake of clarity, (not a limitation of the invention), assume that the sensing information from every node is a hard decision (activity detected (1) or not (0)). The CSI metric for a given L is defined by equation (3) as:

$$CSI(L) = \frac{H(U)}{L}, H(U) = -\sum_{j=1}^{2^L} p_j \log_2(p_j) \quad (3)$$

where H(U) is the Shannon Entropy for a discrete random variable U that takes on $2^L$ values each with probability $p_j$. These probabilities are estimated based on the sensing measurements taken from the sets of randomly chosen L nodes. Since the CSI metric is a function of entropy, it measures the randomness in the measurements which is proportional to the spatial diversity gain. If the CSI metric for a given L exceeds a threshold as will be described later, then the selected group of $N_c$ users are capable of providing a diversity gain of L.

The CSI metric is normalized between 0 and 1 and monotonically decreases with increase in the number of correlated or dependent observations within the chosen set of nodes. As mentioned earlier, correlated nodes reduce the cooperative sensing gain and as such should be avoided.

For a given group of nodes, the CSI metric is used to estimate the achievable spatial diversity gain by computing the CSI metric for increasing values of L. The value of L at which the CSI metric falls below a predetermined threshold is termed as achievable diversity gain.

The CSI metric for randomly chosen L nodes is estimated on the selected measurements at step 406 and compared to one or more CSI thresholds at step 408. The CSI threshold could be one or many different thresholds depending on the type of measurements that are used to calculate the CSI metric being considered. If the CSI estimate metric exceeds the CSI threshold at 408, then the achievable spatial diversity gain is considered to be higher than L, and the achievable spatial diversity gain is incremented as L=L+1 at 410. The CSI metric is then re-estimated at 406 using sets of sensing measurements from randomly chosen L+1 nodes out of $N_c$ nodes. The process is repeated until the CSI metric falls below the threshold(s). The value of L when the CSI metric falls below the threshold will be the achievable spatial diversity gain at 412, which gets compared to the specification at 310.

In accordance with further embodiments, there may arise situations where there might not be any known TV stations or cellular towers operating within the CR network. In such cases, the CR devices will perform both group validation as well as primary user sensing simultaneously. In other words, if there are no reference signals that can be sensed for validation then sensing for the primary signal itself is performed for validation (estimation of CSI etc.) and use cooperative sensing within the group to make a decision on whether a primary user is present or not.

Figure 5:
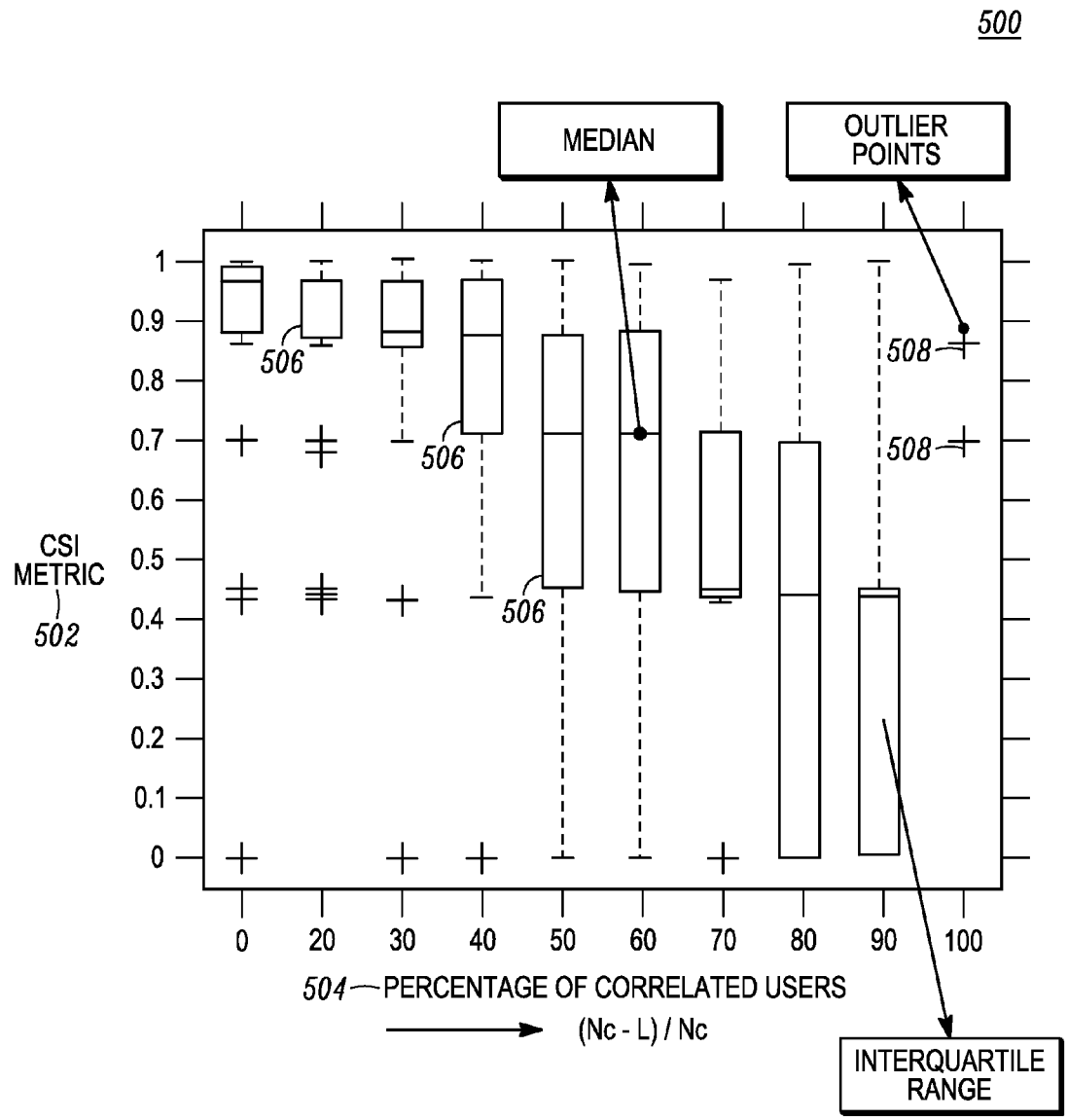
FIG. 5 is a box plot illustration of the variation in the CSI metric with the percentage of uncorrelated or independent users within a cooperative sensing group in accordance with an embodiment of the invention.

Referring to FIG. 5, a box plot illustration 500 of the variation in the CSI metric as a function of the correlation between the sensing measurements from cooperating users in accordance with an example of various embodiments of the invention. The y-axis 502 shows the CSI metric and the x-axis 504 shows the percentage of correlated users. Variability of the CSI metric is represented by the various boxes, such as boxes 506 each box representing an interquartile range. Outlier points 508 represent statistical data falling outside of the interquartile ranges 506. Simulation tests for a given configuration have shown that for a selected number of correlated and uncorrelated nodes (Nc) of 10 and randomly selecting sets of L=4 nodes and the measurement samples associated therewith, the CSI metric may show very high values when the percentage of correlated users is less than 60 percent. As the number of correlated users (within the set of Nc users) increases, the CSI metric begins decreasing. The downward trend of CSI metrics continues with increasing percentages of correlated users. Again, the selection of uncorrelated users leads to increased diversity gain with optimal network configuration.

Accordingly, there has been provided a cooperative sensing technique for a cognitive radio network that determines achievable diversity gain for selected groups of secondary users within the network. Once the achievable diversity gain meets a specified spatial diversity gain (required to detect a primary system), the selected group of CR users can detect the presence of primary activity. The spectral sensing advantageously incorporates cooperation between users to improve primary user detection capability by choosing a group of cooperating nodes that meet predetermined spatial diversity gain requirements, while keeping the number of cooperating nodes to a minimum. Further, the technique does not require any location information of the cooperating nodes which is desirable.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method of cooperative sensing (CS) in a cognitive radio network having a base station and a plurality of cognitive radios (CRs) seeking to operate using a channel ordinarily dedicated to a primary system, comprising:
   selecting a group of subscribers within the plurality of CRs;
   sensing by the group of subscribers using a sensing configuration provided by the base station;
   receiving the sensing results at the base station from the group of subscribers;
   estimating an achievable spatial diversity gain for the group of subscribers based on sensing measurements;
   validating the group of subscribers by determining whether the achievable spatial diversity gain for the group of subscribers is sufficient to meet a predetermined spatial diversity gain requirement; and
   spectrum sensing by the validated group to identify a suitable channel for communication amongst the subscribers in the spectrum ordinarily dedicated to the primary system when the achievable spatial diversity gain meets the predetermined spatial diversity gain requirement; and
   selecting a new group of users from amongst the CRs when the achievable spatial diversity gain is insufficient to meet the predetermined diversity requirement.

2. The method of claim 1, wherein the step of validating further comprises:
   selecting an initial number of subscribers from the group;
   randomly selecting subscribers from the group based on the initial number;
   selecting sensing measurements across the randomly selected subscribers;
   estimating a cooperative sensing index (CSI) metric based on the selected sensing measurements;
   comparing the CSI metric to a CSI threshold, the CSI threshold being set to determine uncorrelated users within the group of subscribers; and
   increasing the number of subscribers from which to select within the group until the CSI metric comparison determines that no more uncorrelated users are present within the group of subscribers thereby providing the achievable spatial diversity gain.

3. The method of claim 1, wherein the sensing configuration used to validate a group of subscribers comprises a sensing a list of known transmitters overlapping with CR systems.

4. The method of claim 3, wherein when there are no known transmitters the group of subscribers perform group validation by sensing the incumbent or primary user transmitter signals.

5. The method of claim 3, wherein the sensing configuration includes the channels or frequencies to sense, type of sensing method and type of sensing feedback.

6. A method of cooperative sensing in a cognitive radio (CR) network, comprising:
   selecting a group of subscribers;
      cooperatively sensing data in the form of hard decisions and soft information from the group;
   validating of the group of users by comparing the sensed data relative to a cooperative sensing index (CSI) metric to determine an achievable spatial diversity gain within the group, wherein the step of validating the group of subscribers comprises:
      choosing an initial number of subscribers;
      randomly selecting the chosen number of subscribers within the group;
      selecting sensing measurements from the randomly selected subscribers;
      estimating the CSI metric based on the randomly selected sensing measurements;
      comparing the estimated CSI metric to a CSI threshold;
      increasing the sample size of sensing measurements when the CSI metric exceeds the CSI threshold(s); and
      providing an achievable spatial diversity gain for the selected subscriber group when the CSI comparison indicates that there are no uncorrelated users are within selected the group,
      wherein the CSI metric is based on a statistical Entropy metric as a measure of the uncertainty or randomness;
   comparing the achievable spatial diversity gain of the group to a predetermined spatial diversity gain requirement; and
   communicating by the group of subscribers within the primary system's spectrum in response to the group of subscribers having an achievable spatial diversity gain that meets the primary systems predetermined spatial diversity gain requirement.

7. The method of claim 6, further comprising the step of:
   periodically verifying the validity of the selected group's achievable spatial diversity gain.

8. The method of claim 6, wherein location information pertaining to cooperating subscribers within the selected group is unknown.

9. The method of claim 6, wherein the spectrum comprises television white space.

* * * * *